US008669973B2

(12) United States Patent
Sakurai et al.

(10) Patent No.: US 8,669,973 B2
(45) Date of Patent: Mar. 11, 2014

(54) LIQUID CRYSTAL DISPLAY ELEMENT, LIQUID CRYSTAL DISPLAY DEVICE, AND METHOD FOR DISPLAYING WITH LIQUID CRYSTAL DISPLAY ELEMENT

(75) Inventors: Takehisa Sakurai, Osaka (JP); Shuichi Kozaki, Osaka (JP); Shoichi Ishihara, Osaka (JP); Masako Nakamura, Osaka (JP); Mitsuhiro Murata, Osaka (JP); Tadashi Ohtake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 211 days.

(21) Appl. No.: 13/148,508

(22) PCT Filed: Mar. 2, 2010

(86) PCT No.: PCT/JP2010/001416
§ 371 (c)(1),
(2), (4) Date: Aug. 9, 2011

(87) PCT Pub. No.: WO2010/137209
PCT Pub. Date: Dec. 2, 2010

(65) Prior Publication Data
US 2011/0316843 A1  Dec. 29, 2011

(30) Foreign Application Priority Data

May 29, 2009   (JP) ................................. 2009-131555

(51) Int. Cl.
*G09G 5/00*   (2006.01)

(52) U.S. Cl.
USPC ............................... 345/212; 345/67; 345/55

(58) Field of Classification Search
USPC ............................................ 345/212, 67, 55
See application file for complete search history.

(56) References Cited

U.S. PATENT DOCUMENTS 6,128,061 A   10/2000   Lee et al.
6,525,798 B1   2/2003   Yamakita et al.
(Continued)

FOREIGN PATENT DOCUMENTS

CN     1694152       11/2005
JP     06-148596 A    5/1994
(Continued)

OTHER PUBLICATIONS

European Search Report mailed Nov. 6, 2012 in European Application 10780172.2.

*Primary Examiner* — William Boddie
*Assistant Examiner* — Leonid Shapiro
(74) *Attorney, Agent, or Firm* — Nixon & Vanderhye P.C.

(57) ABSTRACT

A liquid crystal display element, a liquid crystal display device, and a method for displaying with a liquid crystal display element, wherein picture element electrodes (30) and a common electrode (36) are provided, each of a plurality of sub-picture elements (22) is provided with the common electrode (36) and a corresponding one of the picture element electrodes (30) in such a manner that the sub-picture elements (22) have different distances (a first distance d1 and a second distance d2) between the common electrode (36) and their corresponding ones of the picture element electrodes (30), display in a low gray scale region is carried out by means of a first sub-picture element (22a) that is a sub-picture element (22) in which the distance is short, display in a middle gray scale region is carried out by means of a second sub-picture element (22b) that is a sub-picture element (22) in which the distance is long, and display in a high gray scale region is carried out by means of the first sub-picture element (22a) and the second sub-picture element (22b).

13 Claims, 9 Drawing Sheets

(56) References Cited

U.S. PATENT DOCUMENTS

| | | |
|---|---|---|
| 2001/0038372 A1 | 11/2001 | Lee |
| 2005/0088398 A1 | 4/2005 | Lee |
| 2005/0105033 A1* | 5/2005 | Itou et al. .................. 349/141 |
| 2005/0253787 A1* | 11/2005 | Nishimura et al. ............ 345/67 |
| 2005/0253797 A1 | 11/2005 | Kamada et al. |
| 2006/0097971 A1 | 5/2006 | Lee et al. |
| 2006/0274007 A1 | 12/2006 | Lee |
| 2007/0040978 A1* | 2/2007 | Nakayoshi et al. ........... 349/141 |
| 2008/0100764 A1 | 5/2008 | Haruyama |
| 2008/0191986 A1 | 8/2008 | Lee |
| 2008/0246038 A1 | 10/2008 | Um et al. |
| 2008/0284929 A1 | 11/2008 | Kimura |
| 2010/0103158 A1 | 4/2010 | Lee |

FOREIGN PATENT DOCUMENTS

| | | |
|---|---|---|
| JP | 10-319369 A | 12/1998 |
| JP | 11-326955 A | 11/1999 |
| JP | 2001-265298 A | 9/2001 |
| JP | 2001-337339 A | 12/2001 |
| JP | 2003-207795 A | 7/2003 |
| JP | 2006-133724 A | 5/2006 |
| JP | 2006-201594 A | 8/2006 |
| JP | 2008-287115 A | 11/2008 |

\* cited by examiner

F I G. 1
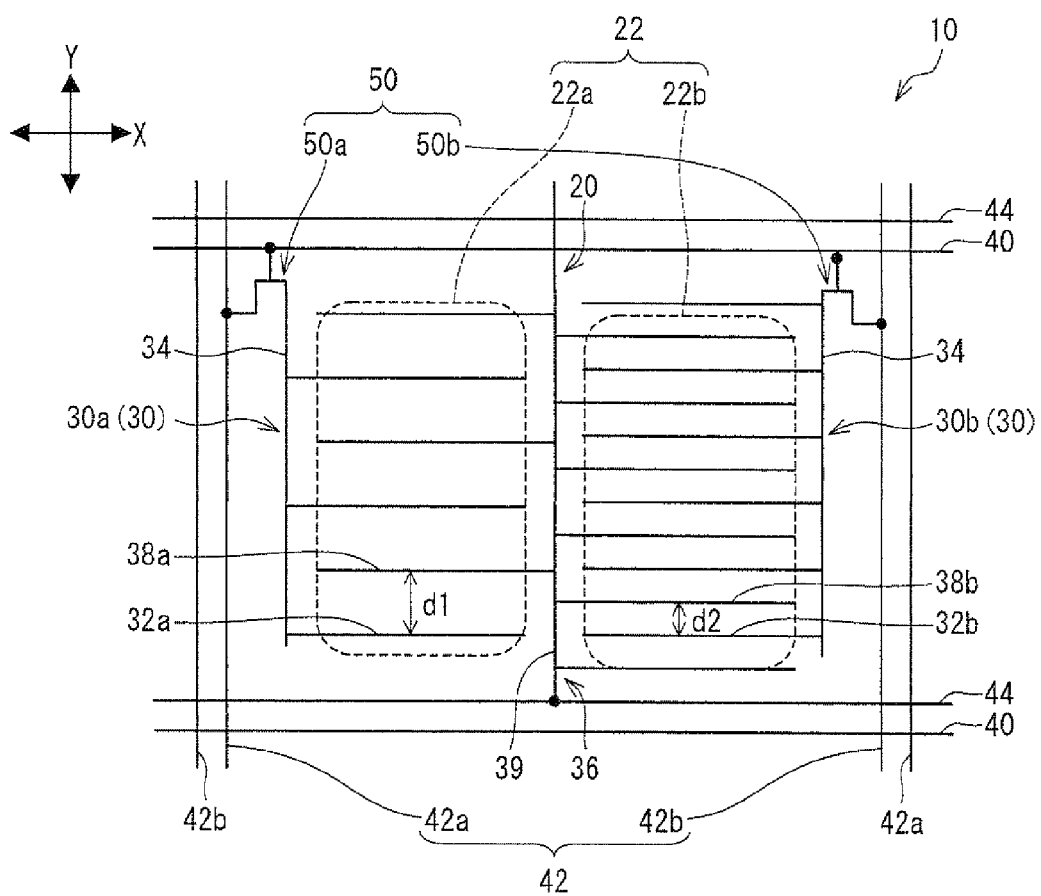

LIQUID CRYSTAL DISPLAY ELEMENT, LIQUID CRYSTAL DISPLAY DEVICE, AND METHOD FOR DISPLAYING WITH LIQUID CRYSTAL DISPLAY ELEMENT

This application is the U.S. national phase of International Application No. PCT/JP2010/001416 filed 2 Mar. 2010 which designated the U.S. and claims priority to JP Patent Application No. 2009-131555 filed 29 May 2009, the entire contents of each of which are hereby incorporated by reference.

TECHNICAL FIELD

This invention relates to a liquid crystal display element with an improved response speed, a liquid crystal display device with an improved response speed, and a method for displaying at an improved response speed with the liquid crystal display element.

BACKGROUND ART

Various efforts have been made to improve a response speed and a viewing angle characteristic in a liquid crystal display device. In regard to these efforts, various methods for generating an electric field for controlling an orientation of liquid crystal molecules have been proposed. Also, various shapes of pixel electrodes have been proposed in connection with these methods. Representative examples will be described below.

[Patent Literature 1]

Patent Literature 1, for example, describes a technique for improving a response speed or the like, the technique including: finding a correction data voltage by comparing a data voltage of a current frame and a data voltage of a previous frame; and applying the correction data voltage to a data line.

[Patent Literature 2]

Patent Literature 2 describes a technique for improving a viewing angle characteristic or the like, the technique including generating, in a lateral direction, an electric field for controlling an orientation of liquid crystal molecules.

Specifically, Patent Literature 2 describes a liquid crystal display device in which signal wirings provided on one substrate are paired, and an electric field that generates in association with a potential difference between each pair of signal wirings allows the liquid crystal molecules to make a parallel motion parallel to the substrate.

[Patent Literature 3]

Patent Literature 3 describes a technique for improving a viewing angle characteristic or the like, the technique including providing, in each pixel, areas in which different voltages are applied, respectively. Specifically, Patent Literature 3 describes a technique of providing voltage dividing means in a pixel so that voltages to be applied to liquid crystal elements are different from one another.

CITATION LIST

Patent Literature 1

Japanese Patent Application Publication, Tokukai, No. 2001-265298 A (Publication Date: Sep. 28, 2001)

Patent Literature 2

Japanese Patent Application Publication, Tokukaihei, No. 6-148596 A (Publication Date: May 27, 1994)

Patent Literature 3

Japanese Patent Application Publication, Tokukai, No. 2008-287115 A (Publication Date: Nov. 27, 2008)

Patent Literature 4

Japanese Patent Application Publication, Tokukaihei, No. 10-319369 A (Publication Date: Dec. 4, 1998)

Patent Literature 5

Japanese Patent Application Publication, Tokukai, No. 2006-133724 A (Publication Date: May 25, 2006)

Patent Literature 6

Japanese Patent Application Publication, Tokukai, No. 2006-201594 A (Publication Date: Aug. 3, 2006)

SUMMARY OF INVENTION

Technical Problem

However, the above-described conventional arts have the following problems.

[Patent Literature 1]

First, the technique as described in Patent Literature 1 has such a problem that memory for storing display data of a previous frame is required.

Also, there is such a problem that, in a case where, for example, sub pixels are provided so as to divide up each pixel so that a viewing angle characteristic is improved in addition to a response speed, a voltage to be applied to a data line cannot be easily controlled on a sub pixel basis.

[Patent Literature 2]

The technique as described in Patent Literature 2 has such a problem that, when sub pixels are provided so as to divide up a pixel so that a viewing angle characteristic is improved, the number of signal wirings tends to increase in association with the division of the pixel, and whereby an aperture ratio tends to decrease.

Further, when a distance between the signal wirings is shortened, for example, for the purpose of improving a response speed in addition to a viewing angle characteristic, the aperture ratio tends to further decrease.

[Patent Literature 3]

The technique as described in Patent Literature 3 has such a problem that the technique only results in different maximum values of voltages to be applied and is poorly effective in improving a response speed.

As described above, it is difficult for the conventional art to provide a liquid crystal display device having a response speed improved with a simple configuration.

Further, since these techniques have the above-described problems, it is difficult to obtain a liquid crystal display device which has both an improved viewing angle characteristic and an improved response characteristic even by, for example, combining these techniques.

The present invention is accomplished to solve the aforementioned problems. An object of the present invention is to provide a liquid crystal display element having a response speed improved with a simple configuration, a method for displaying with a liquid crystal display element, and a liquid crystal display device. More specifically, an object of the present invention is to provide a liquid crystal display element having a fast response speed in a wide range of luminance regions, a method for displaying with the liquid crystal display element, and a liquid crystal display device.

Solution to Problem

In order to attain the object, a liquid crystal display element according to the present invention is a liquid crystal display element including: two substrates facing each other; a liquid crystal layer sandwiched between the two substrates; and picture elements arranged in matrix, one of the two substrates being provided with a picture element electrode and a common electrode, each of the picture elements being divided up into a plurality of sub-picture elements, a distance between the picture element electrode and the common electrode differing between the plurality of sub-picture elements, at least two of the plurality of sub-picture elements each being provided with a switching element, and display being carried out such that: when an entire gray scale region in display is divided up into a low gray scale region, a middle gray scale region, and a high gray scale region, (a) display in the low gray scale region is carried out mainly by means of a sub-picture element among the sub-picture elements that are each provided with the switching element, in which sub-picture element the distance is short, (b) display in the middle gray scale region is carried out mainly by means of a sub-picture element among the sub-picture elements that are each provided with the switching element, in which sub-picture element the distance is long, and (c) display in the high gray scale region is carried out by means of the sub-picture element in which the distance is short and the sub-picture element in which the distance is long, each of the sub-picture elements being provided with the switching element.

In this configuration, display in the low gray scale region is carried out in the sub-picture element in which the electrode distance is short, display in the middle gray scale region is carried out in the sub-picture element in which the electrode distance is long, and display in the high gray scale region is carried out in both the sub-picture element in which the electrode distance is short and the sub-picture element in which the electrode distance is long.

In the liquid crystal display element in which an orientation of liquid crystal molecules contained in a liquid crystal layer are controlled by use of an electric field between the picture element electrode and the common electrode that are a pair of electrodes provided on the same substrate, the picture element in which the electrode distance is short has a fast response speed and the picture element in which the electrode distance is long has a slow response speed. The picture element in which the electrode distance is long has a particularly fast response speed in a case where an applied voltage applied thereon is low.

Here, in the above-described configuration, display in the low gray scale region that is a region in which an applied voltage is low is carried out mainly by means of the sub-picture element in which the electrode distance is short. That is, the display is carried out by little use of the sub-picture element in which the electrode distance is long, which sub-picture element has a slow response speed. This makes it possible to carry out display with a fast response speed in the low gray scale region.

In the configuration above, display in the middle gray scale region continuing from the low gray scale region is carried out by means of the sub-picture element in which the electrode distance is long. Because a voltage applied in the middle gray scale region is higher than that applied in the low gray scale region, even the sub-picture element in which the electrode distance is long has a relatively fast response speed. Further, by mainly using only the sub-picture element in which the electrode distance is long (i.e., by little use of the sub-picture element in which the electrode distance is short), it becomes possible to further increase the voltage applied to the sub-picture element in which the electrode distance is long. This makes it possible to further shorten the response speed of the sub-picture element. In this manner, display in the middle gray scale region can be carried out with a fast response speed.

Further, in the configuration above, since display in the high gray scale region, which is a region where a high level of luminance is required, is carried out by use of both the sub-picture element in which the electrode distance is short and the sub-picture element in which the electrode distance is long, a desired level of luminance can be obtained.

Thus, the above-described configuration makes it possible to obtain, with a simple configuration of merely switching between sub-picture elements to be used in display, a liquid crystal display element having an improved response speed.

In order to attain the object, a method for displaying with a liquid crystal display element according to the present invention is a method for displaying with a liquid crystal display element including: two substrates facing each other; a liquid crystal layer sandwiched between the two substrates; and picture elements arranged in matrix, wherein: one of the two substrates is provided with picture element electrodes and a common electrode, each of the picture elements is divided up into a plurality of sub-picture elements, each of the plurality of sub-picture elements is provided with the common electrode and a corresponding one of the picture element electrodes in such a manner that the plurality of sub-picture elements have different distances between the common electrode and their corresponding ones of the picture element electrodes, the method comprising: displaying, in a low gray scale region, mainly by means of a sub-picture element in which the distance is short; displaying, in a middle gray scale region, mainly by means of a sub-picture element in which the distance is long; and displaying, in a high gray scale region, mainly by means of the sub-picture element in which the distance is short and the sub-picture element in which the distance is long.

Advantageous Effects of Invention

As described above, in the liquid crystal display element according to the present invention, one of two substrates is provided with picture element electrodes and a common electrode, each of picture elements is divided up into a plurality of sub-picture elements, each of the plurality of sub-picture elements is provided with the common electrode and a corresponding one of the picture element electrodes in such a manner that the plurality of sub-picture elements have different distances between the common electrode and their corresponding ones of the picture element electrodes, at least two of the plurality of sub-picture elements is each provided with a switching element, and display is carried out such that: when an entire gray scale region in display is divided up into a low gray scale region, a middle gray scale region, and a high gray scale region, (a) display in the low gray scale region is carried out mainly by means of a sub-picture element among the sub-picture elements that are each provided with the switching element, in which sub-picture element the distance is short, (b) display in the middle gray scale region is carried out mainly by means of a sub-picture element among the sub-picture elements that are each provided with the switching element, in which sub-picture element the distance is long, and (c) display in the high gray scale region is carried out by means of the sub-picture element in which the distance is short and the sub-picture element in which the distance is long, each of the sub-picture elements being provided with the switching element.

Further, as described above, in the method for displaying with a liquid crystal display element according to the present invention, one of two substrates is provided with picture element electrodes and a common electrode, each of the picture elements is divided up into a plurality of sub-picture elements, each of the plurality of sub-picture elements is provided with the common electrode and a corresponding one of the picture element electrodes in such a manner that the plurality of sub-picture elements have different distances between the common electrode and their corresponding ones of the picture element electrodes, the method including: displaying, in a low gray scale region, mainly by means of a sub-picture element in which the distance is short; displaying, in a middle gray scale region, mainly by means of a sub-picture element in which the distance is long; and displaying, in a high gray scale region, mainly by means of the sub-picture element in which the distance is short and the sub-picture element in which the distance is long.

With these configurations, it becomes possible to provide a liquid crystal display element having a response speed improved with a simple configuration, and a method for displaying with such a liquid crystal display element.

BRIEF DESCRIPTION OF DRAWINGS

FIG. 1 is a schematic view of a liquid crystal display element according to one embodiment of the present invention.

DESCRIPTION OF EMBODIMENTS

Figure 2:
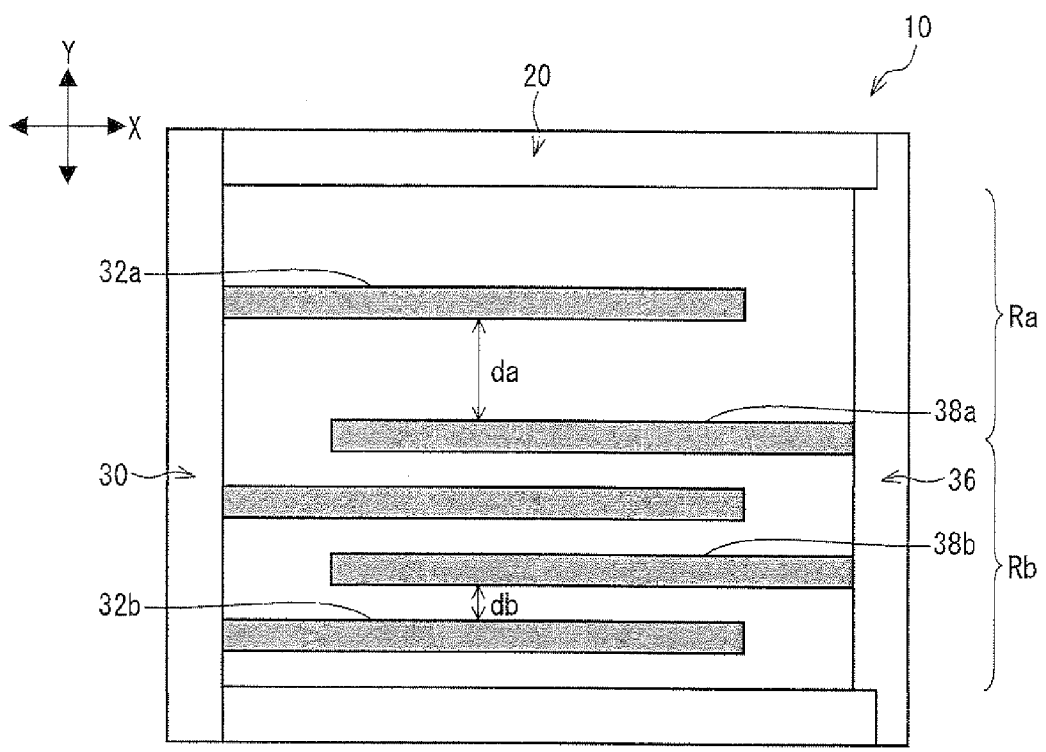
FIG. 2 is a schematic view of a picture element constituting a liquid crystal display element according to the embodiment of the present invention.

Embodiments of the present invention will be hereinafter described in detail.

Embodiment 1

One embodiment of the present invention will be described below with reference to FIGS. 1 to 6.

FIG. 1 is a schematic view of a liquid crystal display element 10 according to the present embodiment. Specifically, FIG. 1 is a schematic view of one of a plurality of picture elements 20 that are arranged in matrix. FIG. 1 mainly illustrates electrodes and wirings of the picture element 20.

As illustrated in FIG. 1, each picture element 20 of the liquid crystal display element 10 according to the present embodiment is divided into two regions (sub-picture elements 22). Each of the two regions has interleaved electrodes therein. An interdigital distance of the interleaved electrodes (i.e., a distance between "digits" of digit shapes of the interleaved electrodes) in one region is different from that in the other region. This will be described in further detail below.

[Configuration of Wiring]

The liquid crystal display element 10 according to the present embodiment includes the plurality of picture elements 20 being arranged in matrix and substantially rectangular. Each of the picture elements 20 is a region surrounded by scanning signal lines 40 and signal electrode lines 42, the scanning signal lines 40 being provided in a direction orthogonal to a direction in which the signal electrode lines 42 are provided.

Specifically, the liquid crystal display element 10 includes two substrates (not shown) which sandwich a liquid crystal layer (not shown) that contains liquid crystal molecules. The scanning signal lines 40 and the signal electrode lines 42 are provided on one of the two substrates (this one of the two substrate is hereinafter referred to as an array substrate). In the example as illustrated in FIG. 1, the scanning signal line 40 is provided in a lateral direction (a direction as indicated by the double-pointed arrow X in FIG. 1), and the signal electrode lines 42 are provided in a vertical direction (a direction as indicated by the double-pointed arrow Y in FIG. 1).

More specifically, the liquid crystal display element 10 includes two signal electrode lines 42 per one picture element 20. Specifically, a first signal electrode line 42a is provided along a side of the picture element 20, said side being on one side in the lateral direction, and a second signal electrode line 42b is provided along a side of the picture element 20, said side being on the other side in the lateral direction.

A common signal line 44 is provided on the array substrate in the lateral direction together with the scanning signal line 40.

As described above, the picture element 20 according to the present embodiment is a region surrounded by the scanning signal line 40, the common signal line 44, the first signal electrode line 42a, and the second signal electrode line 42b as illustrated in FIG. 1.

The picture element 20 according to the present embodiment is divided into two regions, specifically, two sub-picture elements 22 that are a first sub-picture element 22a and a second sub-picture element 22b.

The sub-picture elements 22 are controlled respectively by different TFTs 50 serving as switching electrodes. Specifically, a first TFT 50a is provided near a point at which the first signal electrode line 42a and the scanning signal line 40 intersect each other. A second TFT 50b is provided near a point at which the second signal electrode line 42b and the scanning signal line 40 intersect each other.

The first sub-picture element 22a is switched on and off by the first TFT 50a and the second sub-picture element 22b is switched on and off by the second TFT 50b.

[Configuration of Electrodes]

Next, a description will be given on a configuration of a picture element electrode or the like in the picture element 20. In the liquid crystal display element 10 according to the present embodiment, picture element electrodes 30 and a common electrode 36 are provided on the array substrate that is one of the two substrates that face each other. The picture element electrodes 30 and the common electrode 36 are shaped to interleave each other.

First, the picture element electrodes 30 will be described below. The picture element electrodes 30 are configured by a first picture element electrode 30a that corresponds to the first sub-picture element 22a and a second picture element electrode 30b that corresponds to the second sub-picture element 22b.

The first picture element electrode 30a is connected to a drain electrode (not shown) of the first TFT 50a, and the second picture element electrode 30b is connected to a drain electrode (not shown) of the second TFT 50b.

Next, the common electrode 36 will be described below. The common electrode 36 is provided in a manner extending from the common signal line 44. Specifically, the common electrode 36 is provided in a manner extending along the vertical direction from a central position of the picture element 20 in the lateral direction.

The picture element electrodes 30 and the common electrode 36 are shaped to interleave each other.

Specifically, the first picture element electrode 30a has a picture element electrode main line portion 34 that extends along the vertical direction from the first TFT 50a, and a first picture element electrode digit portion 32a that is a digit portion extended from the picture element electrode main line portion 34 along the lateral direction. The second picture element electrode 30b has a picture element electrode main line portion 34 that extends along the vertical direction from the second TFT 50b, and a second picture element electrode digit portion 32b that is a digit portion extended from the picture element electrode main line portion 34 along the lateral direction.

The common electrode 36 has a common electrode main line portion 39 which is provided in a manner extending along the vertical direction from the common signal line 44, and a first common electrode digit portion 38a and a second common electrode digit portion 38b which are digit portions extended along the lateral direction from the common electrode main line portion 39.

In each of the sub-picture elements 22, the picture element electrode 30 and the common electrode 36 interleave each other. Specifically, in the first sub-picture element 22a, the first picture element electrode digit portion 32a and the first common electrode digit portion 38a are interleaved with each other. In the second sub-picture element 22b, the second picture element electrode digit portion 32b and the second common electrode digit portion 38b are interleaved with each other.

[Brief Description of Driving]

As described above, in the liquid crystal display element 10 according to the present embodiment, a transverse electric field is generated by means of the one or more pairs of electrodes (the picture element electrode(s) 30 and the common electrode 36) that are formed on one substrate, so as to drive the liquid crystal layer sandwiched between the one substrate and another substrate facing the one substrate. Specifically, in the liquid crystal display element 10, the pair of electrodes are configured by transparent conductive materials that are formed in the same layer of the same substrate. The display is controlled by changing an orientation of the liquid crystal molecules contained in the liquid crystal layer, according to an intensity of a voltage applied between the electrodes, that is, according to an intensity of an electric field generated by the voltage application.

The liquid crystal display element 10 is constituted by units of the picture elements 20, each of which is constituted by the scanning signal line 40 as a gate and the first signal electrode line 42a and the second signal electrode line 42b as sources. That is, the liquid crystal display element 10 has a configuration of a so-called double-source type. Signal voltages from the signal electrode lines are applied to the interleaved picture element electrodes 30, so as to drive the liquid crystal layer by means of electric fields formed between the respective picture element electrodes 30 and the common electrode 36 (i.e., between the pair of electrodes).

[Electrode Distance]

Next, a description will be given on an electrode distance between the interleaved electrodes.

In the liquid crystal display element 10 according to the present embodiment, a distance between the electrodes in the first sub-picture element 22a and a distance between the electrodes in the second sub-picture element 22b are different from each other. Specifically, a first distance d1, which is a distance between the first picture element electrode digit portion 32a and the first common electrode digit portion 38a in the first sub-picture element 22a, is different from a second distance d2, which is a distance between the second picture element electrode digit portion 32b and the second common electrode digit portion 38b in the second sub-picture element 22b.

As illustrated in FIG. 1, the liquid crystal display element 10 according to the present embodiment is exemplified as one having a configuration in which the first distance d1 is longer than the second distance d2.

Since the above described distance between electrodes differs between the sub-picture elements 22 in the liquid crystal display element 10 according to the present embodiment, it is possible to have an improved response speed.

[Electrode Distance and Response Speed]

First, a relation between an electrode distance and a response speed will be described below. FIG. 2 is a schematic view of the liquid crystal display element 10, for explaining a relation between an electrode distance and a response speed. Specifically, FIG. 2 schematically illustrates an arrangement of the picture element electrode 30 and the common electrode 36 in the picture element 20.

In the configuration as illustrated in FIG. 2, one picture element has a region a (region Ra as shown in FIG. 2) and a region b (region Rb as shown in FIG. 2). In the region a the electrode distance is long, and in the region b, the electrode distance is short.

Specifically, a distance a is longer than a distance b, where the distance a is a distance between the first picture element electrode digit portion 32a and the first common electrode digit portion 38a in the region a, and the distance b is a distance between the second picture element electrode digit portion 32b and the second common electrode digit portion 38b in the region b.

For driving of the liquid crystal display element 10 as illustrated in FIGS. 1 and 2, which liquid crystal display element 10 is driven by transverse electric field driving by use of so called interleaved electrodes, two or more sub-picture elements may be provided in one picture element 20, so as to improve a viewing angle characteristic. Also, for driving of the liquid crystal display element 10, an electrode width (Line, L) of the interleaved electrodes or a distance (Space, S) between the interleaved electrodes may be changed between the sub-picture elements. That is, as illustrated in FIG. 2, for example, a region a in which an electrode distance is long and a region b in which an electrode distance is short are provided in one picture element 20.

Here, in a case where the plurality of sub-picture elements 22 are provided in one picture element 20 and the electrode distance is made different between the sub-picture elements 22, a response speed as a whole may be reduced. This is because a response speed is reduced especially in a low gray scale region in which an applied voltage is low. This will be described in further detail below.

Figure 3:
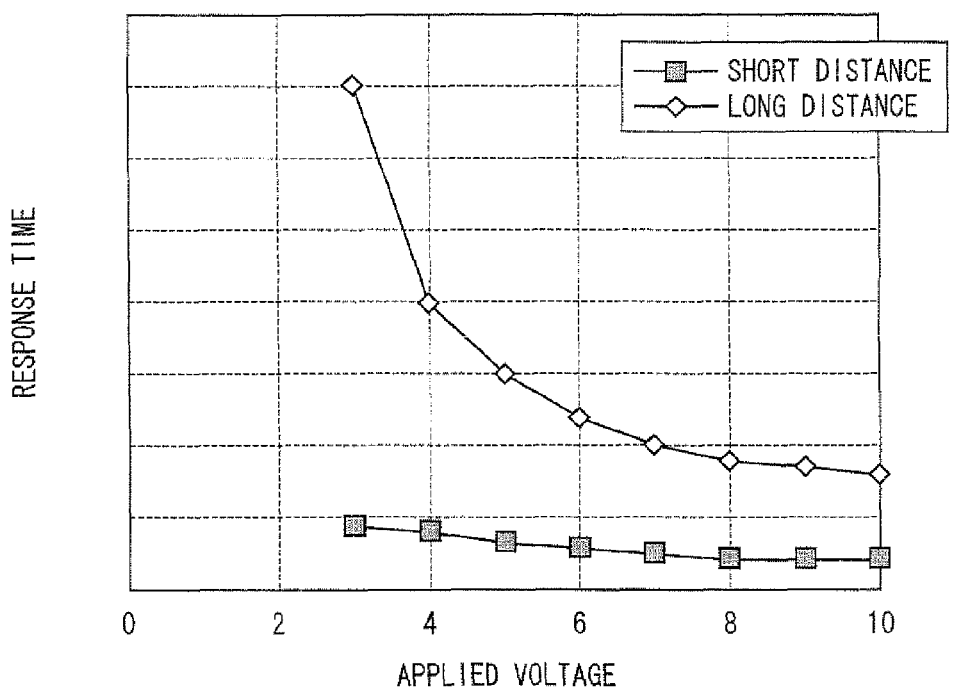
FIG. 3 is a graph showing a relation between an applied voltage and response time according to the embodiment of the present invention.

FIG. 3 is a graph showing a relation between an applied voltage (hereinafter given a reference sign (V)) and a response speed. In FIG. 3, an unfilled diamond-shaped sign represents the region (Ra) in which the electrode distance is long and a black square sigh represents the region (Rb) in which the electrode distance is short.

As shown in FIG. 3, in a region in which an applied voltage applied therein is low, there is a big difference between response time in the region (Ra) with the long electrode distance response time in the region (Rb) with the short electrode distance, and the response time in the region (Ra) with the long electrode distance is longer than the response time in the region (Rb) with the short electrode distance.

On the other hand, in a region in which an applied voltage is high, there is a small difference between response time in the region (Ra) with the long electrode distance and response time in the region (Rb) with the short electrode distance.

Due to this, in a case where each picture element 20 include the plurality of sub-picture elements 22 having the region (Ra) with the long electrode distance and the region (Rb) with the short electrode distance, display carried out in an entire gray scale region by means of both regions (Ra and Rb), for example, may result in a long response time as a whole because of a particularly long response time in the low gray scale region in the region (Ra) in which the electrode distance is long.

[Driving According to Present Embodiment]

Next, driving of the liquid crystal display element 10 according to the present embodiment will be described below.

In the liquid crystal display element 10 according to the present embodiment, driving is carried out in such a manner that a signal voltage is independently applied to each of the sub-picture elements 22 so as not to lower the response speed.

Specifically, in a case where low brightness is desired (i.e., in the low gray scale region), only a sub-picture element 22 with the short electrode distance is driven.

In a case where brightness higher than the maximum brightness of the sub-picture element 22 with the short electrode distance is desired (i.e., in the middle gray scale region), the sub-picture element 22 with the short electrode distance is not driven but a sub-picture element 22 with the long electrode distance is driven.

Further, in a case where brightness higher than the maximum brightness of the sub-picture element 22 with the long electrode distances desired (i.e., in the high gray scale region), both the sub-picture elements 22 respectively with the long and the short electrode distances are driven.

In this way, a region with a long response time in the sub-picture element 22 with the long electrode distance is not used, whereby the response speed can be improved in an entire gray scale region (luminance region).

Here, the low gray scale region, the middle gray scale region, and the high gray scale region can be defined in various ways. For example, the middle gray scale region can be defined as a gray scale region ranging from a gray scale value of not less than 30% nor more than 45% of the maximum gray scale value to a gray scale value of not less than 55% nor more than 70% of the maximum gray scale value. The low gray scale region can be defined as a gray scale region ranging from the minimum gray scale value to a lower limit gray scale value of the middle gray scale region. The high gray scale region can be defined as a gray scale region ranging from an upper limit gray scale value of the middle gray scale region to the maximum gray scale value.

[Applied Voltage and Brightness]

Figure 4:
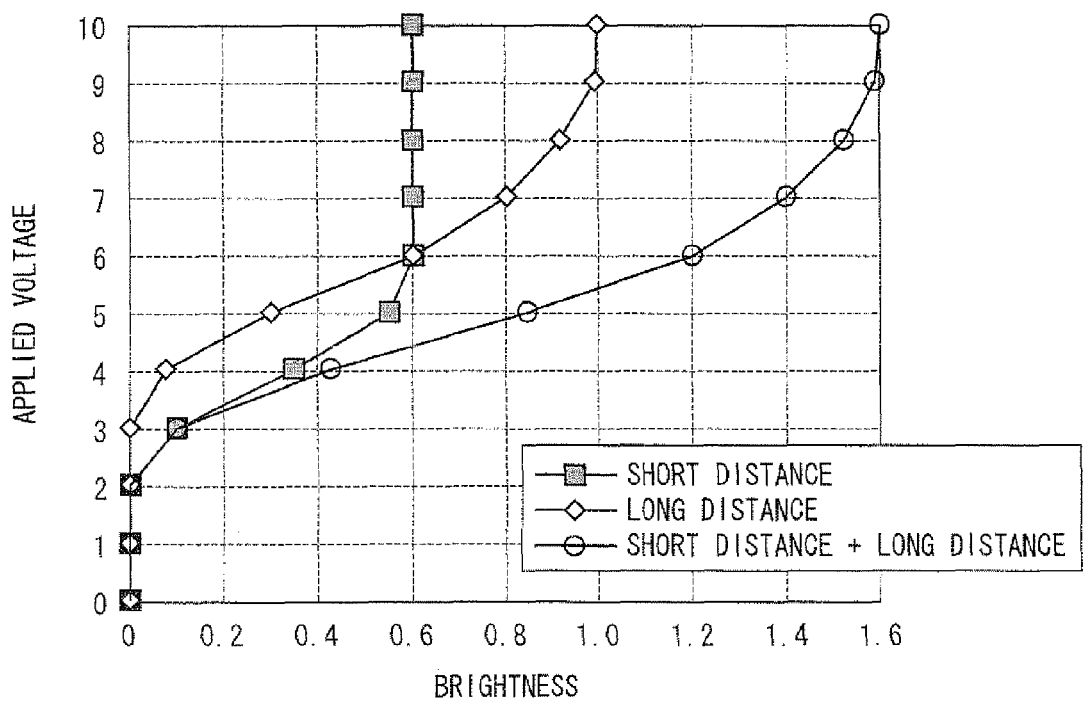
FIG. 4 is a graph showing a relation between an applied voltage and brightness according to the embodiment of the present invention.

FIG. 4 is a graph showing a relation between an applied voltage and brightness. Specifically, FIG. 4 shows said relation in the region with the long electrode distance (unfilled diamond-shaped sign) and in the region with the short electrode distance (filled square sign). An unfilled circular sign as shown in FIG. 4 indicates a value obtained by adding a value in the region with the long electrode distance to a value in the region with the short electrode distance. In the region with the long electrode distance, Line/Space=4/12 um, and in the region with the short electrode distance, Line/Space=4/4 um.

As shown in FIG. 4, in the liquid crystal display element 10 having the above-described configuration, when a voltage of 6 V is applied, both the region with the long electrode distance and the region with the short electrode distance will have the same brightness of 0.6.

Figure 5:
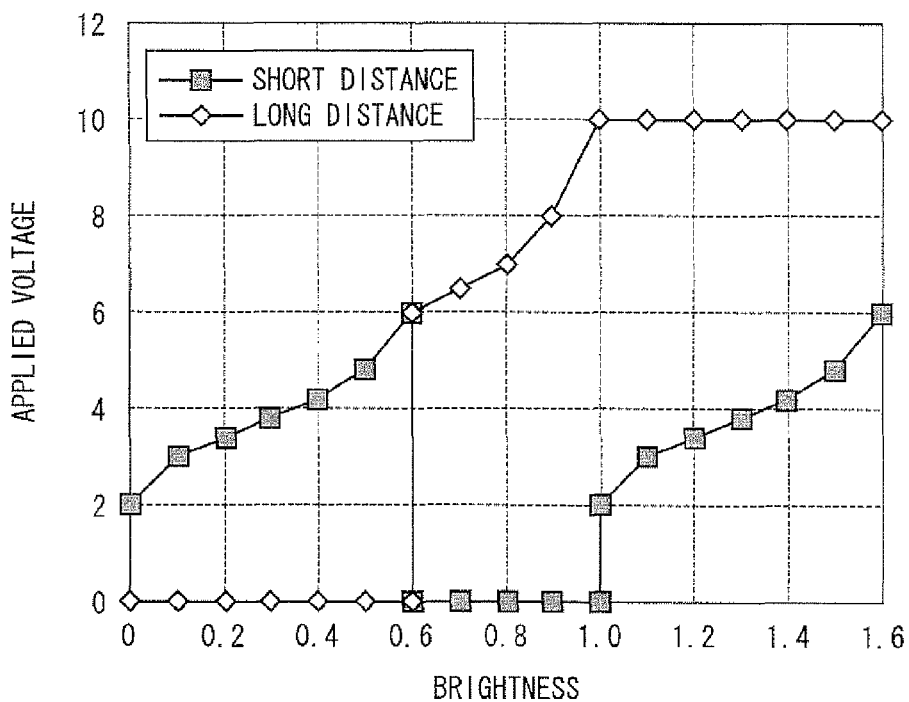
FIG. 5 is a graph showing a relation between brightness and an applied voltage according to the embodiment of the present invention, according to the embodiment of the present invention.

Based on this result and the relation between an applied voltage and response time as previously described with reference to FIG. 3, a voltage as shown in FIG. 5 is applied in the liquid crystal display element 10 according to the present embodiment.

FIG. 5 is a graph showing a relation between brightness (gray scale) and an applied voltage and also roughly showing how driving is carried out in the present embodiment. FIG. 5 shows an entire region ranging from the minimum gray scale value to the maximum gray scale value. In FIG. 5, the unfilled diamond-shaped sign represents the region with the long electrode distance and a filled square sign represents the region with the short electrode distance, in the similar manner as the above described graphs. In other words, the unfilled diamond-shaped sign represents driving in a sub-picture element 22 (hereinafter referred to as the first sub-picture element 22a) which corresponds to the region with the long electrode distance. Likewise, the filled square sign represents driving in a sub-picture element 22 (hereinafter referred to as the second sub-picture element 22b) which corresponds to the region with the short electrode distance.

As shown in FIG. 5, in a case where the liquid crystal display element 10 according to the present embodiment carries out display with brightness of less than 0.6 (i.e., in the low gray scale region), the first sub-picture element 22a corresponding to the region with the long electrode distance is not used, since the first sub-picture element 22a has a slow response. The display is carried out by applying a voltage only to the second sub-picture element 22b corresponding to the region in which the electrode distance is short and thus has a fast response, thereby driving the second sub-picture element 22b only.

In a case where display is to be carried out with brightness of 0.6 to less than 1.0 (i.e., in the middle gray scale region), the first sub-picture element 22a is used because the display cannot be carried out solely by means of the second sub-picture element 22b. Here, in a state where the second sub-picture element 22b has been turned on, a region (a range of applied voltages) in which the first sub-picture element 22a has a slow response speed is used. For this reason, the display is carried out by using only the first sub-picture element 22a without turning on the second sub-picture element 22b.

In a case where display is to be carried out with brightness of 1.0 or greater (i.e., in the high gray scale region), the display is carried out by changing a voltage to be applied to the second sub-picture element 22b while maintaining the brightness of the first sub-picture element 22a to the maximum level.

The minimum response speed can be obtained by carrying out driving by application of a waveform as described above.

Figure 6:
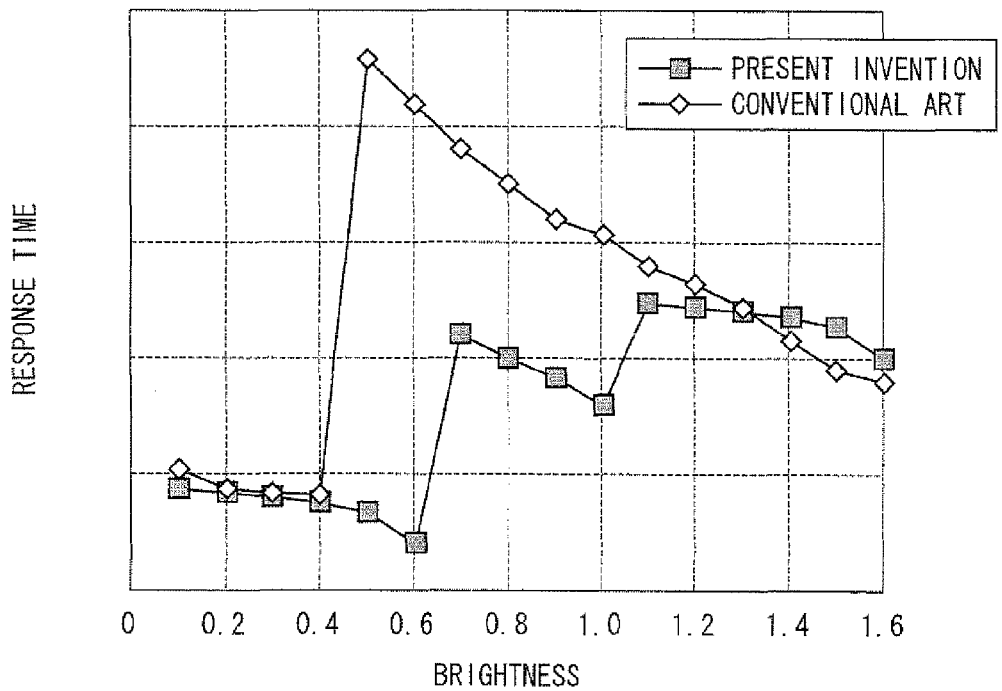
FIG. 6 is a graph showing a relation between brightness and response time according to the embodiment of the present invention.

FIG. 6 is a graph showing a relation between brightness and a response speed. Specifically, in FIG. 6, a filled square sign represents the liquid crystal display element 10 according to the present embodiment and an unfilled diamond-shaped sign represents a conventional liquid crystal display element.

As shown in FIG. 6, the liquid crystal display element 10 according to the present embodiment was able to obtain a faster response characteristic in the entire brightness region (entire luminance region) than that of the conventional liquid crystal display element, by employing the driving as described above with reference to FIG. 5.

This is made possible because a region that gives the fastest response speed in each of the sub-picture elements 20 can be used by employing the above-described driving.

As described above, the liquid crystal display element 10 according to the present embodiment can have improved response speeds in the entire luminance region, in other words, in the entire gray scale region. The driving of the liquid crystal display element 10 according to the present embodiment is carried out based on the following principles.

That is, take a configuration, for example, in which the sub-picture elements 22 are provided in each picture element and a relation between a voltage and a transmittance is made different between the sub-picture elements 22, for the purpose of giving different viewing angle characteristics to the picture element. Further, take a method in which an electrode distance between interleaved electrodes is changed, as an example of methods for obtaining the different relations between a voltage and a transmittance.

Here, in a portion where the electrode distance is long, response time tends to be long although a transmittance is high. In a case where a high voltage is applied in the portion with the long electrode distance, the portion has a short response time and therefore has little problem even if driving is carried out with the same level of signal voltage as that for a portion where the electrode distance is short. On the other hand, in a case where a low voltage is applied in the portion with the long electrode distance, the response time becomes very long. In view of this, by avoiding use of the portion with the long electrode distance in order to perform the display in the brightness region in which the portion with the long electrode distance has the long response time, it is possible to drive the portion with the long electrode distance while maintaining the short response time.

Based on this, a response speed is controlled by separately changing, according to the desired brightness in display to be carried out, (i) a voltage to be supplied to the sub-picture element with the short electrode distance and (ii) a voltage to be supplied to the sub-picture element with the long electrode distance. At this time, the voltages to be applied to the sub-picture elements 22 are made different from each other according to desired brightness in display to be carried out. This can be done by generating, in a signal generation source provided in a driving circuit, voltages according to the desired brightness in display to be carried out in the sub-picture elements 22, and the generated voltages are applied to the sub-picture elements 22 via the plurality of signal electrode lines 42 (the first signal electrode line 42a, the second signal electrode line 42b) provided in each picture element.

More specifically, two signal electrode lines 42 are provided to each picture element 20, and different signal voltages are applied to the sub-picture element 22 having a small interdigital distance (electrode distance) and to the sub-picture element 22 having a long interdigital distance. In this way, it becomes possible to separately set voltages to be applied to the sub-picture element 22 having the small interdigital distance and the sub-picture element 22 having the long interdigital distance so as to apply, to each of the sub-picture elements 22, a voltage that may achieve as a fast response speed as possible. Also, by applying voltages to the sub-picture elements 22 in the above-described manner, it becomes possible to improve a response speed especially around brightness of the middle gray scale.

Embodiment 2

Next, another embodiment of the liquid crystal display element 10 according to the present invention will be described below with reference to FIGS. 7 to 11.

For easy explanation, the like reference signs will be given to members each having the like function as a member as illustrated in the figures of Embodiment 1, and descriptions on such a member will be omitted.

Figure 7:
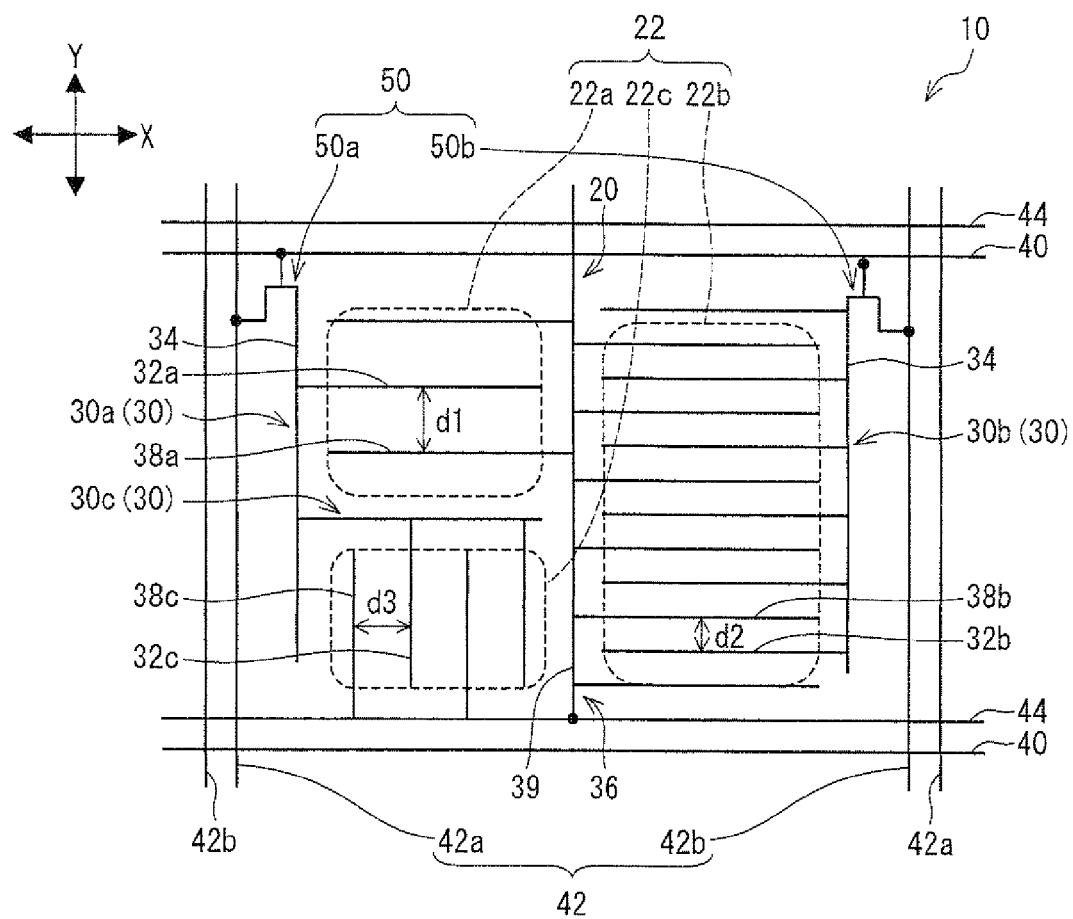
FIG. 7 is a schematic view of a liquid crystal display element according to another embodiment of the present invention.

FIG. 7 is a schematic view of a liquid crystal display element 10 according to the present embodiment. The liquid crystal display element 10 according to the present embodiment is different from the liquid crystal display element 10 according to Embodiment 1 in that the liquid crystal display element 10 according to the present embodiment includes a picture element 20 that is divided up into three sub-picture elements 22.

[Configuration with Long and Short Electrode Distances]

That is, in the liquid crystal display element 10 according to Embodiment 1, one picture element 20 is divided up into the first sub-picture element 22a in which the electrode distance is long and the second sub-picture element 22b in which the electrode distance is short, as illustrated in FIG. 1.

On the other hand, in the liquid crystal display element 10 according to the present embodiment, each gray scale picture element 20 is divided up into a first sub-picture element 22a and a third sub-picture element 22c in each of which the electrode distance is long, and a second sub-picture element 22b in which the electrode distance is short, as illustrated in FIG. 7. The electrode distance in the first sub-picture element 22a is equal to that in the third sub-picture element 22c.

Specifically, the third sub-picture element 22c is provided in a region which corresponds to the region where the first sub-picture element 22a is provided in the liquid crystal display element 10 according to Embodiment 1. That is, the first sub-picture element 22a is reduced in size and the third sub-picture element 22c is provided in a region that has become available due to the reduction in size of the first sub-picture element 22a.

Configuration of electrodes in the third sub-picture element 22c will be described below. A third picture element electrode 30c, which is a picture element electrode 30 in the third sub-picture element 22c, extends from the picture element electrode main line portion 34 that extends from a drain electrode of the first TFT 50a, in a similar manner as the first picture element electrode 30a. The third picture element electrode 30c is an interleaved electrode like the first picture element electrode 30a etc., and has a third picture element electrode digit portion 32c that extends along the vertical direction.

A common electrode 36 in the third sub-picture element 22c is an interleaved electrode like the third picture element electrode 30c. Specifically, a third common electrode digit portion 38c, which is a digit portion extending in a digit shape from the common signal line 44 along the vertical direction, is provided as the common electrode 36 in the third sub-picture element 22c.

The electrode distance in the third sub-picture element 22c is a distance (a third distance d3 as shown in FIG. 7) between the third picture element electrode digit portion 32c and the third common electrode digit portion 38c. In the liquid crystal display element 10 according to the present embodiment, the third distance d3 is equal to the above described first distance d1.

This configuration makes it possible to improve a viewing angle characteristic of the liquid crystal display element 10. This is because regions are provided in one picture element 20, in one (the third sub-picture element 22c) of which regions an orientation of electrodes is different from those of electrodes in the others (the first sub-picture element 22a and the second sub-picture element 22b) by 90 degrees.

[Configuration with Long, Middle, and Short Electrode Distances]

Next, another exemplary configuration according to the present embodiment will be described below.

In the liquid crystal display element 10 as illustrated in FIG. 7, the first distance d1, which is an electrode distance in the first sub-picture element 22a, is equal to the third distance d3, which is an electrode distance in the third sub-picture element 22c.

Here, the third distance d3 does not necessarily need to be equal to the first distance d1 but may be different therefrom. For example, the electrode distance in the third sub-picture element 22c may take a value that is between the value of the electrode distance in the first sub-picture element 22a and the value of the electrode distance in the second sub-picture element 22b (such an electrode distance as in the third sub-picture element 22c may be hereinafter referred to as a middle electrode distance). That is, the third distance d3 may take a value that is between the values of the above-described first and second distances d1 and d2.

Specifically, in a case where, for example, the first distance d1 is 12 um ([Line/Space in the first sub-picture element 22a]=4/12 um) and the second distance d2 is 4 um ([Line/Space in the second sub-picture element 22b]=4/4 um), the third distance d3, for example, may be 8 um ([Line/Space in the third sub-picture element 22c]=4/8 um) or other value.

Further, in a case where the third sub-picture element 22c is provided in one picture element 20 in addition to and together with the first sub-picture element 22a and the second sub-picture element 22b, and the first, second, and third sub-picture elements 22a, 22b, and 22c have different electrode distances from each other, it is preferable that a new TFT 50, for example, a third TFT or the like for driving the third sub-picture element 22c, be provided for the purpose of driving the third sub-picture element 22c independently of the first and second sub-picture elements 22a and 22b. In this way, a voltage to be applied to the third sub-picture element 22c can be separately controlled.

Properties of the liquid crystal display element 10 having the above-described configuration will be described below with reference to FIGS. 8 to 11. The following is a description on properties in a case where the first sub-picture element 22a, the second sub-picture element 22b, and the third sub-picture element 22c can be controlled independently of one another.

Figure 8:
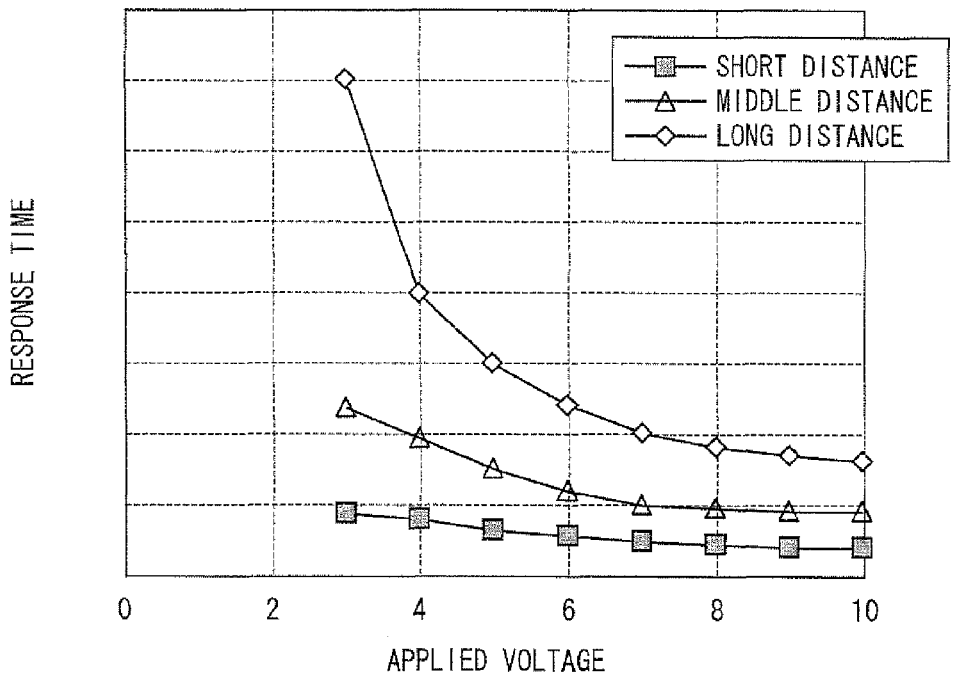
FIG. 8 is a graph showing a relation between an applied voltage and response time according to the another embodiment of the present invention.
Figure 9:
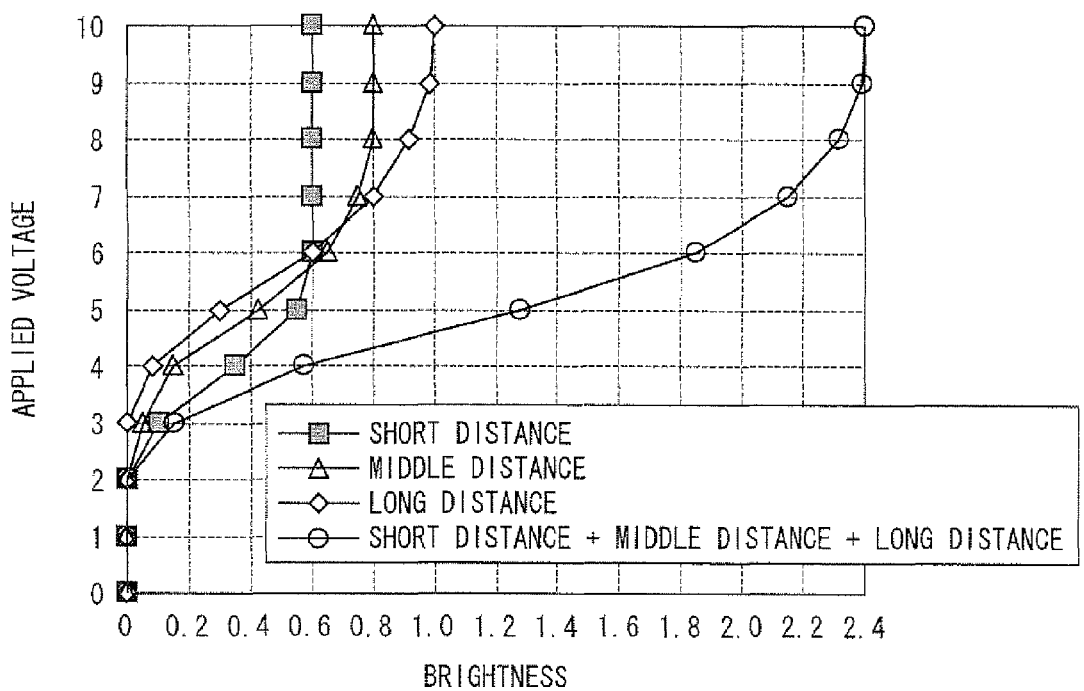
FIG. 9 is a graph showing a relation between an applied voltage and brightness according to the another embodiment of the present invention.
Figure 10:
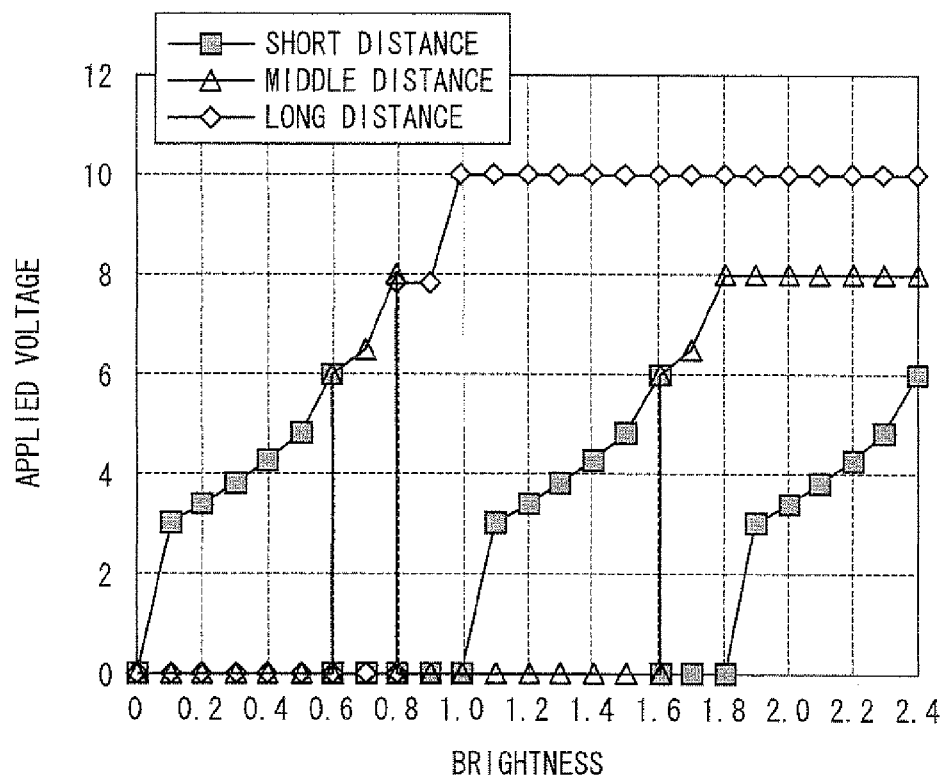
FIG. 10 is a graph showing a relation between brightness and an applied voltage according to the another embodiment of the present invention.
Figure 11:
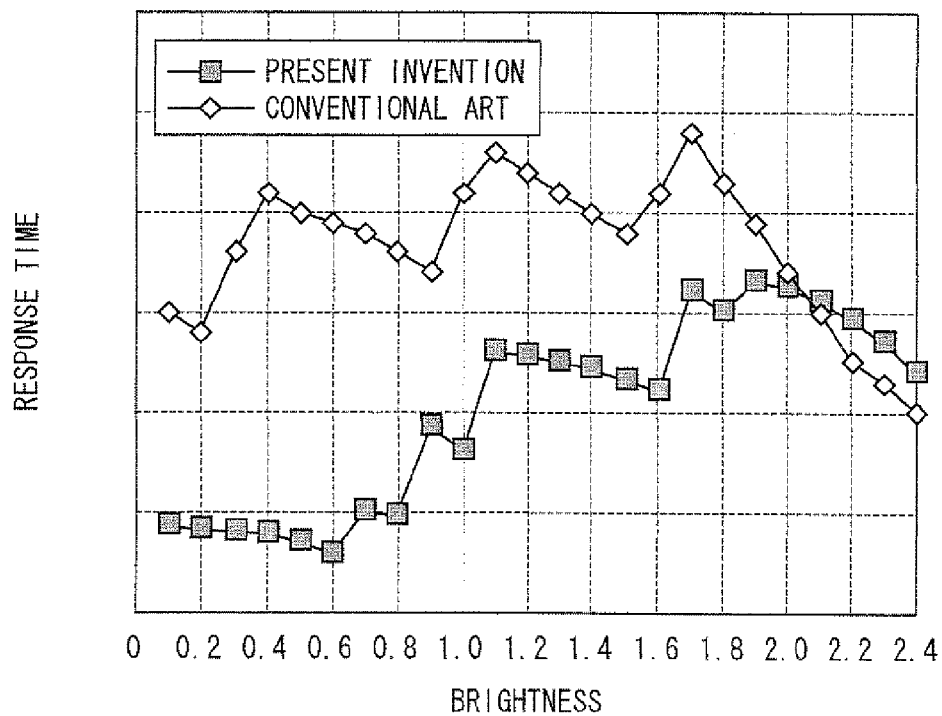
FIG. 11 is a graph showing a relation between brightness and response time according to the another embodiment of the present invention.

FIGS. 8 to 11 correspond to FIGS. 3 to 6, respectively. FIG. 8 shows a relation between an applied voltage and response time. FIG. 9 shows a relation between an applied voltage and brightness. FIG. 10 shows a relation between brightness and an applied voltage. FIG. 11 shows a relation between brightness and response time.

Among the explanatory illustrations in FIGS. 8 to 11, those different from the ones as previously described will be described below. Unfilled triangular signs in FIGS. 8 to 10 each indicate a case where the electrode distance is middle. An unfilled circular sign in FIG. 9 indicates a value obtained by summing up a value in a region in which the electrode distance is long, a value in a region in which the electrode distance is middle, and a value in a region in which the electrode distance is short.

In the liquid crystal display element 10 having the above-described configuration, a sub-picture element(s) 22 to be used for display is(are) switched over among the first sub-picture element 22a, the second sub-picture element 22b, and the third sub-picture element 22c as shown in FIG. 10, in ascending order of brightness as follows: the second sub-picture element 22b (short electrode distance), the third sub-picture element 22c (middle electrode distance), the first sub-picture element 22a (long electrode distance), simultaneous use of the first sub-picture element 22a (long electrode distance) and the second sub-picture element 22b (short electrode distance), simultaneous use of the first sub-picture element 22a (long electrode distance) and the third sub-picture element 22c (middle electrode distance), and simultaneous use of the first sub-picture element 22a (long electrode distance), the second sub-picture element 22b (short electrode distance), and the third sub-picture element 22c (middle electrode distance).

In the liquid crystal display element 10 having the above-described configuration, it is possible to obtain a response time shortening effect around middle range brightness as shown in FIG. 11, in a similar manner as the liquid crystal display element 10 according to Embodiment 1 as previously described with reference to FIG. 6.

[Waveform Example]

Figure 12:
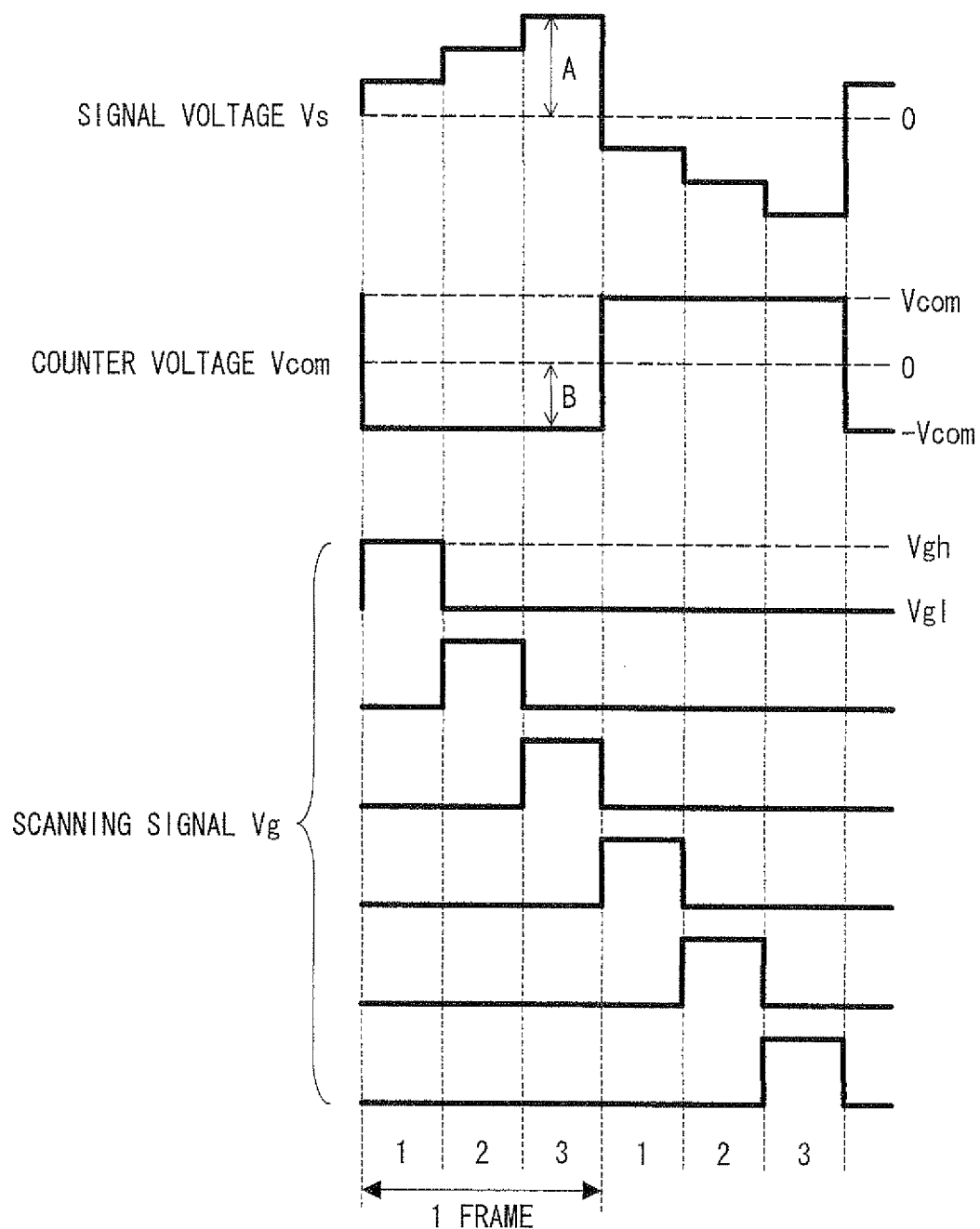
FIG. 12 is a diagram showing a waveform to be applied according to an embodiment of the present invention.

Next, a description will be given on an example of a waveform regarding the liquid crystal display element 10 according to the present invention, with reference to FIG. 12. FIG. 12 shows an example of a waveform applied to the liquid crystal display element 10 in a case where a counter voltage is AC driven.

In the liquid crystal display element 10, it is possible to increase a signal voltage to be applied to each of the sub-picture elements 22, by AC driving a counter voltage signal that is a signal to be applied to the common signal line 44 in such a manner that the counter voltage signal has an opposite phase to that of the voltage to be applied to each of the sub-picture elements 22. Also, by carrying out driving in this manner, it is possible to further improve a response speed of the liquid crystal display element 10. This will be described in detail below with reference to FIG. 12.

More specifically, FIG. 12 shows a signal voltage (Vs) to be applied to the signal electrode line 42, a counter voltage (Vcom) to be applied to the common signal line 44 (common electrode 36), and a scanning signal (Vg, Vgh: high, Vgl: low) to be applied to the scanning signal line 40. FIG. 12 shows an example in which a screen (frame) is formed by three lines in frame driving.

In the liquid crystal display element 10, first writing and second writing are performed respectively with voltages identical in amplitude but opposite in polarity so as to eliminate a DC component applied to a liquid crystal. Here, in the example of a waveform as shown in FIG. 12, the counter voltage is AC driven so that the counter voltage signal has a reverse polarity of that of a voltage to be applied to each of the sub-picture elements 22.

As a result, a voltage to be applied to the liquid crystal has a value that is obtained by subtracting Vcom from Vs (A+B). This makes it possible to increase the voltage to be applied to the liquid crystal, so that a response speed of the liquid crystal display element 10 can be further improved.

Note that there is no limitation in particular to the values of the above-described voltages. For example, the values can be set such that Vg−15 V, Vs±5 V, Vcom±5 V or the like.

[Entire Configuration]

Figure 13:
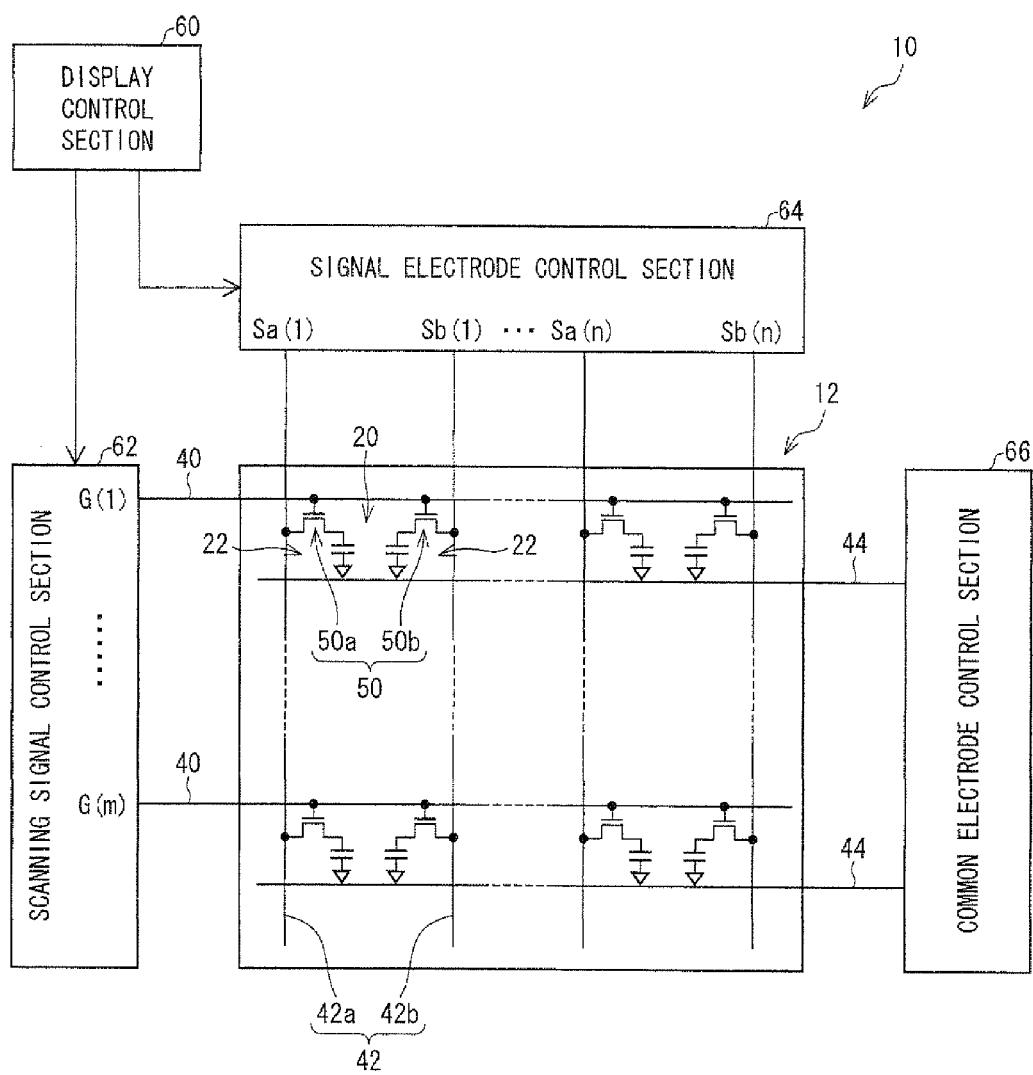
FIG. 13 is a view illustrating an entire configuration of a liquid crystal display element according to an embodiment of the present invention.

Next, a general description will be given on an entire configuration of the liquid crystal display element 10 with reference to FIG. 13. FIG. 13 is a schematic view of an entire configuration of the liquid crystal display element 10.

As illustrated in FIG. 13, the liquid crystal display element 10 according to the present embodiment has a liquid crystal display panel 12 in which the picture elements 20 are arranged in matrix, a display control section 60, a scanning signal control section 62 as a gate driver, a signal electrode control section 64 as a source driver, and a common electrode control section 66. The display control section 60 controls the scanning signal control section 62 and the signal electrode control section 64. The control of turning on the sub-picture elements 22 as described, for example, with reference to FIG. 5 or the like is carried out via the display control section 60 and the common electrode control section 66, in particular, via the signal electrode control section 64.

Further, the driving method as described, for example, with reference to FIG. 12 or the like is carried out via the display control section 60 and the common electrode control section 66, in particular, via the common electrode control section 66.

The present invention is not limited to the above-described embodiments but allows various modifications within the scope of the claims. Any embodiment obtained by appropriately combining the technical means disclosed in the different embodiments will also be included in the technical scope of the present invention.

For example, in the liquid crystal display element 10 according to Embodiment 1, it is possible to perform the display in a low brightness region of, for example, up to 1.0, by using both of the first sub-picture element 22*a* corresponding to the region in which the electrode distance is long and the second sub-picture element 22*b* corresponding to the region in which the electrode distance is short. For example, an output ratio of the first sub-picture element 22*a* and the second sub-picture element 22*b* may be, but not limited to, such a ratio as 1:9 or 9:1, thereby making it possible to obtain a good viewing angle characteristic while obtaining an improved response speed at the same time.

That is, by applying also to the sub-picture element 22 with the long electrode distance a voltage in such a voltage range that the response speed of the sub-picture element 22 with the long electrode distance does not adversely affect the use of both the sub-picture elements, it is possible to utilize additional brightness from the sub-picture element 22 in which the electrode distance is long. This makes it possible to improve a viewing angle characteristic.

Further, an area ratio of the sub-picture elements 22 in the liquid crystal display element 10 and Line/Space in the sub-picture elements 22 as described above are not limited in particular but allows various modifications.

Also, there is no limitation in particular on a liquid crystal mode to be used in the liquid crystal display element 10. The liquid crystal display element 10 may be used, for example, with IPS or the like.

The liquid crystal display element may be used as a display section so as to constitute various types of liquid crystal display devices such as a liquid crystal TV, a mobile terminal or the like.

Further, in the liquid crystal display element according to the present invention, the low gray scale region is a gray scale region ranging from a minimum gray scale value to a gray scale value corresponding to an applied voltage with which luminance of the sub-picture element in which the distance is long is greater than luminance of the sub-picture element in which the distance is short, in a case where a same potential is applied to the sub-picture element in which the distance is short and to the sub-picture element in which the distance is long, the middle gray scale region is a gray scale region continuing from the low gray scale region to a highest gray scale value that is obtainable by luminance obtained solely by means of the sub-picture element in which the distance is long, and the high gray scale region is a gray scale region continuing from the middle gray scale region to a maximum gray scale value.

When the picture element in which the electrode distance is long and the picture element in which the electrode distance is short are compared with each other in terms of luminance (intensity of light per unit area), the following matter is observed. That is, in a gray scale region in which an applied voltage is low, the picture element in which the electrode distance is short has higher luminance than the picture element in which the electrode distance is long, and in a gray scale region in which an applied voltage is high, the picture element in which the electrode distance is long has higher luminance than the picture element in which the electrode distance is short.

Here, in the configuration above, the low gray scale region is a gray scale region which corresponds to an applied voltage with which the sub-picture element in which the electrode distance is short has luminance higher than that of the sub-picture element in which the electrode distance is long in a case where the same potential is applied in both the sub-picture elements. This makes it possible to reliably use, as the low gray scale region, a low voltage region in which display can be carried out by means of the sub-picture element in which the electrode distance is short and has a fast response speed.

Also, the middle gray scale region is a gray scale region which continues from the low gray scale region and in which sufficient luminance is obtained solely by means of the sub-picture element in which the electrode distance is long.

As described above, it is possible to obtain a liquid crystal display element with a response speed further reliably improved in a region around middle range brightness.

Further, in the liquid crystal display element according to the present invention, the middle gray scale region is a gray scale region ranging from a lower limit gray scale value of the middle gray scale region to an upper limit gray scale value of the middle gray scale region, wherein the lower limit gray scale value of the middle gray scale region is not less than 30% nor more than 45% of the maximum gray scale value and the upper limit gray scale value of the middle gray scale region is not less than 55% nor more than 70% of the maximum gray scale value, the low gray scale region is a gray scale region ranging from the minimum gray scale value to the lower limit gray scale value of the middle gray scale region, and the high gray scale region is a gray scale region ranging from the upper limit gray scale value of the middle gray scale region to the maximum gray scale value.

This configuration makes it possible to easily set gray scale regions based on gray scale values. Specifically, based on gray scale regions, it is possible to set, as the low gray scale region, a region in which the sub-picture element in which the electrode distance is long has a slow response speed due to a low applied voltage. Also, based on gray scale values, it is possible to set, as the middle gray scale region, a region in which the sub-picture element in which the electrode distance is long has an increased response speed due to a relatively high applied voltage and in which region desired luminance can be obtained solely by means of the sub-picture element in which the electrode distance is long.

Further, in the liquid crystal display element according the present invention, display in the low gray scale region is carried out solely by means of the sub-picture element in which the distance is short, and display in the middle gray scale region is carried out solely by means of the sub-picture element in which the distance is long.

In this configuration, display in each gray scale region is carried out solely by means of a sub-picture element suitable for improving the response speed. This makes it possible to further improve the response speed.

Further, in the liquid crystal display element according to the present invention, each of the picture elements is divided up into at least three sub-picture elements, at least three of the sub-picture elements are each provided with a switching element, and when a sub-picture element which is among the sub-picture elements each provided with the switching element and in which the distance is between the distance of the sub-picture element in which the distance is short and the distance of the sub-picture element in which the distance is long is denoted as a sub-picture element in which the distance is middle, display in the middle gray scale region is carried out mainly by means of the sub-picture element in which the distance is short and the sub-picture element in which the distance is long, and display in the high gray scale region is carried out mainly by means of the sub-picture element in which the distance is middle, the sub-picture element in which the distance is short, and the sub-picture element in which the distance is long.

Still further, in the liquid crystal display element according to the present invention, each of the picture elements is provided with a plurality of signal electrode lines so that different voltages can be supplied to the sub-picture elements, respectively.

This configuration makes it possible to independently drive each sub-picture element with a different applied voltage.

Further, in the liquid crystal display element according to the present invention, each of the picture elements is provided with a common signal line which is connected to the common electrode and is common to the sub-picture elements of the picture element.

This configuration makes it possible to easily provide, in each of the sub-picture elements, a configuration in which driving is carried out between the picture element electrode and the common electrode. This makes it easy for a potential difference between the picture element electrode and the common electrode to be different between the sub-picture elements.

Further, in the liquid crystal display element according to the present invention, the picture element electrodes are formed to interleave with the common electrode.

This configuration makes it easy to set the electrode distances and to reduce the electrode distances. This makes it easy to improve the response speed.

Further, in the liquid crystal display element according to the present invention, the sub-picture elements in each picture element are different in directions along which digits of the picture element electrode and the digit-shaped common electrode extend.

In this configuration, a direction along which a digit portion extends differs between the sub-picture elements. Due to this, regions are formed in a pixel, in each of which regions an orientation of liquid crystal molecules is different from that of liquid crystal molecules in the other regions.

As a result, it becomes possible to improve a viewing angle characteristic of the liquid crystal display element.

Further, in the liquid crystal display element according to the present invention, an upper limit gray scale value of the low gray scale region is so set that a response speed of a desired value or less is obtainable after display in the low gray scale region is switched to display in the middle gray scale region; and an/the upper limit gray scale value of the middle gray scale region is so set that a response speed of a desired value or less is obtainable after display in the middle gray scale region is switched to display in the high gray scale region.

This configuration makes it possible to satisfy a desired response speed in the entire gray scale region, which response speed is determined, for example, based on a product specification or the like.

Also, this configuration increases a range of brightness within which range a plurality of sub-picture elements are driven at the same time, thereby making it possible to improve a viewing angle characteristic.

Further, in the liquid crystal display element according to the present invention, a counter voltage to be applied to the common electrode is reversed for every frame in frame driving, and the counter voltage is opposite in phase to a voltage to be applied to the picture element electrode.

This configuration can increase a voltage to be applied to liquid crystal molecules, thereby further improving the response speed.

Further, a liquid crystal display device according to the present invention includes the liquid crystal display element as a display section.

INDUSTRIAL APPLICABILITY

The present invention can be suitably applied to a display device for which a fast response speed is required, for example, to a liquid crystal TV or the like.

REFERENCE SIGNS LIST

10: liquid crystal display element
12: liquid crystal display panel
20: picture element
22: sub-picture element
22a: first sub-picture element (sub-picture element)
22b: second sub-picture element (sub-picture element)
22c: third sub-picture element (sub-picture element)
30: picture element electrode
30a: first picture element electrode (picture element electrode)
30b: second picture element electrode (picture element electrode)
30c: third picture element electrode (picture element electrode)
32a: first picture element electrode digit portion (digit portion of picture element electrode)
32b: second picture element electrode digit portion (digit portion of picture element electrode)

32c: third picture element electrode digit portion (digit portion of picture element electrode)
34: picture element electrode main line portion (picture element electrode)
36: common electrode
38a: first common electrode digit portion (digit portion of common electrode)
38b: second common electrode digit portion (digit portion of common electrode)
38c: third common electrode digit portion (digit portion of common electrode)
39: common electrode main line portion (common electrode)
40: scanning signal line
42: signal electrode line
42a: first signal electrode line
42b: second signal electrode line
44: common signal line
50: TFT (switching element)
50a: first TFT (switching element)
50b: second TFT (switching element)
60: display control section
62: scanning signal control section
64: signal electrode control section
66: common electrode control section
d1: first distance (distance between picture element electrode and common electrode)
d2: second distance (distance between picture element electrode and common electrode)
d3: third distance (distance between picture element electrode and common electrode)

The invention claimed is:

1. A liquid crystal display element comprising:
two substrates facing each other;
a liquid crystal layer sandwiched between the two substrates; and
picture elements arranged in matrix,
one of the two substrates being provided with picture element electrodes and a common electrode,
each of the picture elements being divided up into a plurality of sub-picture elements,
each of the plurality of sub-picture elements being provided with the common electrode and a corresponding one of the picture element electrodes in such a manner that the plurality of sub-picture elements have different distances between the common electrode and their corresponding ones of the picture element electrodes,
at least two of the plurality of sub-picture elements each being provided with a switching element, and
display being carried out such that: when an entire gray scale region in display is divided up into a low gray scale region, a middle gray scale region, and a high gray scale region, (a) display in the low gray scale region is carried out mainly by means of a sub-picture element among the sub-picture elements that are each provided with the switching element, in which sub-picture element the distance is short, (b) display in the middle gray scale region is carried out mainly by means of a sub-picture element among the sub-picture elements that are each provided with the switching element, in which sub-picture element the distance is long, and (c) display in the high gray scale region is carried out by means of the sub-picture element in which the distance is short and the sub-picture element in which the distance is long, each of the sub-picture elements being provided with the switching element.

2. The liquid crystal display element according to claim 1, wherein:
the low gray scale region is a gray scale region ranging from a minimum gray scale value to a gray scale value corresponding to an applied voltage with which luminance of the sub-picture element in which the distance is long is greater than luminance of the sub-picture element in which the distance is short, in a case where a same potential is applied to the sub-picture element in which the distance is short and to the sub-picture element in which the distance is long,
the middle gray scale region is a gray scale region continuing from the low gray scale region to a highest gray scale value that is obtainable by luminance obtained solely by means of the sub-picture element in which the distance is long, and
the high gray scale region is a gray scale region continuing from the middle gray scale region to a maximum gray scale value.

3. The liquid crystal display element according to claim 1, wherein:
the middle gray scale region is a gray scale region ranging from a lower limit gray scale value of the middle gray scale region to an upper limit gray scale value of the middle gray scale region, wherein the lower limit gray scale value of the middle gray scale region is not less than 30% nor more than 45% of the maximum gray scale value and the upper limit gray scale value of the middle gray scale region is not less than 55% nor more than 70% of the maximum gray scale value, the low gray scale region is a gray scale region ranging from the minimum gray scale value to the lower limit gray scale value of the middle gray scale region, and
the high gray scale region is a gray scale region ranging from the upper limit gray scale value of the middle gray scale region to the maximum gray scale value.

4. The liquid crystal display element according to claim 1, wherein display in the low gray scale region is carried out solely by means of the sub-picture element in which the distance is short, and display in the middle gray scale region is carried out solely by means of the sub-picture element in which the distance is long.

5. The liquid crystal display element according to claim 1, wherein:
each of the picture elements is divided up into at least three sub-picture elements,
at least three of the sub-picture elements are each provided with a switching element, and
when a sub-picture element which is among the sub-picture elements each provided with the switching element and in which the distance is between the distance of the sub-picture element in which the distance is short and the distance of the sub-picture element in which the distance is long is denoted as a sub-picture element in which the distance is middle, display in the middle gray scale region is carried out mainly by means of the sub-picture element in which the distance is short and the sub-picture element in which the distance is long, and display in the high gray scale region is carried out mainly by means of the sub-picture element in which the distance is middle, the sub-picture element in which the distance is short, and the sub-picture element in which the distance is long.

6. The liquid crystal display element according to claim 1, wherein each of the picture elements is provided with a plurality of signal electrode lines so that different voltages can be supplied to the sub-picture elements, respectively.

7. The liquid crystal display element according to claim 6, wherein each of the picture elements is provided with a common signal line which is connected to the common electrode and is common to the sub-picture elements of the picture element.

8. The liquid crystal display element according to claim 1, wherein the picture element electrodes are formed to interleave with the common electrode.

9. The liquid crystal display element according to claim 8, wherein the sub-picture elements in each picture element are different in directions along which digits of the picture element electrode and the digit-shaped common electrode extend.

10. The liquid crystal display element according to claim 1, wherein:
an upper limit gray scale value of the low gray scale region is so set that a response speed of a desired value or less is obtainable after display in the low gray scale region is switched to display in the middle gray scale region; and
an/the upper limit gray scale value of the middle gray scale region is so set that a response speed of a desired value or less is obtainable after display in the middle gray scale region is switched to display in the high gray scale region.

11. The liquid crystal display element according to claim 1, wherein a counter voltage to be applied to the common electrode is reversed for every frame in frame driving, and the counter voltage is opposite in phase to a voltage to be applied to the picture element electrode.

12. A liquid crystal display device including a liquid crystal display element according to claim 1 as a display section.

13. A method for displaying with a liquid crystal display element including: two substrates facing each other; a liquid crystal layer sandwiched between the two substrates; and picture elements arranged in matrix, wherein:
one of the two substrates is provided with picture element electrodes and a common electrode,
each of the picture elements is divided up into a plurality of sub-picture elements,
each of the plurality of sub-picture elements is provided with the common electrode and a corresponding one of the picture element electrodes in such a manner that the plurality of sub-picture elements have different distances between the common electrode and their corresponding ones of the picture element electrodes,
the method comprising:
displaying, in a low gray scale region, mainly by means of a sub-picture element in which the distance is short;
displaying, in a middle gray scale region, mainly by means of a sub-picture element in which the distance is long; and
displaying, in a high gray scale region, mainly by means of the sub-picture element in which the distance is short and the sub-picture element in which the distance is long.

* * * * *